United States Patent [19]

Kobayashi et al.

[11] Patent Number: 4,971,180
[45] Date of Patent: Nov. 20, 1990

[54] SHOCK ABSORBER

[75] Inventors: Toshiyuki Kobayashi, Toyota; Hiroyoshi Kako, Nagoya; Koichi Sugihara, Toyota, all of Japan

[73] Assignee: Toyota Jidosha Kabushiki Kaisha, Aichi, Japan

[21] Appl. No.: 276,486

[22] Filed: Nov. 28, 1988

[30] Foreign Application Priority Data

Dec. 28, 1987 [JP] Japan ............... 62-329842

[51] Int. Cl.$^5$ .................. F16F 9/46; F16F 9/49
[52] U.S. Cl. .................. 188/319; 188/315; 188/322.22
[58] Field of Search .......... 188/299, 319, 313, 322.22, 188/315, 322.16, 322.17, 314, 280, 318; 280/707, 714

[56] References Cited

U.S. PATENT DOCUMENTS

| | | |
|---|---|---|
| 3,272,495 | 9/1966 | Axthammer ............ 188/315 X |
| 3,559,776 | 2/1971 | Schultze ............... 188/299 |
| 4,561,524 | 12/1985 | Mizumukai et al. ...... 188/319 |
| 4,660,689 | 4/1987 | Hayashi et al. ........ 188/319 |
| 4,706,787 | 11/1987 | Wossner ............... 188/299 |
| 4,732,408 | 3/1988 | Ohlin ................. 188/299 X |
| 4,821,851 | 4/1989 | Kruckemeier et al. .... 188/319 |

FOREIGN PATENT DOCUMENTS

| | | |
|---|---|---|
| 1159781 | 12/1963 | Fed. Rep. of Germany ...... 188/315 |
| 2038571 | 2/1972 | Fed. Rep. of Germany ...... 188/315 |
| 3406214 | 8/1985 | Fed. Rep. of Germany ...... 188/319 |
| 60-102536 | 7/1985 | Japan . |
| 2154700 | 9/1985 | United Kingdom ............. 188/299 |

Primary Examiner—Robert J. Oberleitner
Attorney, Agent, or Firm—Oliff & Berridge

[57] ABSTRACT

A shock absorber includes a cylinder, a piston disposed movably in the cylinder to partition the interior of the cylinder into first and second liquid chambers and having two groups of ports affording communication between the first and second liquid chambers, a valve body disposed so as to open and close the port of each group in the piston and a piston rod connected with the piston and projecting from the cylinder to the outside. The shock absorber further includes a liquid path affording communication between the first and second liquid chambers without passing through the piston, first and second valves for generating respectively damping force with liquid flowing through the liquid path and regulator provided in the piston rod and capable of blocking liquid from flowing through the two groups of ports in the piston.

15 Claims, 3 Drawing Sheets

SHOCK ABSORBER

BACKGROUND OF THE INVENTION

1. Field of the Invention:

This invention relates to a shock absorber and, more particularly, to a shock absorber suited to be installed on a suspension system of a vehicle.

2. Description of the Prior Art:

Generally, a shock absorber includes a cylinder, a piston disposed movably in the cylinder and a piston rod connected with the piston projecting from the cylinder to the outside. The piston is provided with at least a port through which liquid flows when the piston rod is extended and at least a port through which liquid flows when the piston rod is contracted, and valve bodies are provided to open and close these ports.

The shock absorber installed on a suspension system of a vehicle provides preferably such a damping force property that the more rapidly the damping force rises, the lower the moving speed of the piston is, while it rises more slowly, the higher the moving speed of the piston is. Thus, the shock absorber has adopted such structure that liquid flows through at least an orifice to generate the damping force within a so-called orifice region when the piston speed is low, while the valve body is flexed by pressure of liquid flowing through the port to thereby generate the damping force within a so-called valve region when the piston speed is high.

Recently, such a shock absorber as disclosed, for example, in Japanese Utility Model Public Disclosure (KOKAI) No. 60-102536 has been proposed, which is capable of changing over the damping force into a plurality of stages respectively in the orifice region and valve region. The shock absorber includes a piston, a piston rod connected with the piston and a valve body, wherein a bypass path provided in the piston rod affords communication between two liquid chambers partitioned by the piston while the valve body is disposed in the bypass path. Any of a plurality of orifices or small holes having various bores provided in the piston rod or valve body is communicated t the bypass path by rotating the valve body for permitting liquid to flow therethrough, or the bypass path is interrupted completely. Thus, the flow rate of liquid flowing through the port in the piston is regulated.

According to the shock absorber disclosed in the Japanese Utility Model Public Disclosure as noted above, since the flow rate of liquid flowing through the bypass path is regulated by the orifices or small holes having various bores, a remarkable change in the damping force property within the orifice region is obtained by rotating the valve body. However, since the flow rate of liquid flowing through the bypass path or interrupted from flowing therethrough is small compared with that of liquid flowing through the port in the piston, only a slight change in the damping force property within the valve region is obtained by rotating the valve body. Thus, when the shock absorber is used for the suspension system of the vehicle, it is difficult to obtain the optimum ride comfort and controllability.

SUMMARY OF THE INVENTION

An object of the present invention is to provide a shock absorber which enables the enlargement of a change in a damping force property within a valve region.

The shock absorber according to the present invention comprises a cylinder, a piston disposed movably in the cylinder to partition the interior of the cylinder into first and second liquid chambers and having two groups of ports each group of which has at least a port affording communication between the first and second liquid chambers, a valve body disposed so as to open and close the port of each group in the piston, a piston rod connected with the piston and projecting from the cylinder to the outside, a liquid path affording communication between the first and second liquid chambers without passing through the piston, first means and second means for generating damping force each means having a valve body which opens and closes the liquid path and on which spring force is worked, the damping force being generated when liquid flows through the liquid path with the valve body opened against said spring force, and regulating means provided in the piston rod and capable of blocking liquid from flowing through the two groups of ports in the piston.

Liquid flows through one of the two groups of ports in the piston when the piston rod is extended while it flows through the other when the piston rod is contracted, where the regulating means does not block liquid from flowing through the two groups of ports.

One of first and second damping force generating means generates the damping force when the piston rod is extended while the other means generates the damping force when the piston rod is contracted.

The shock absorber according to the present invention also comprises a cylinder, a piston disposed movably in the cylinder to partition the interior of the cylinder into first and second liquid chambers and having two groups of ports each group of which has at least a port affording communication between the first and second liquid chambers, a valve body disposed so as to open and close the port of each group in the piston, a piston rod connected with the piston and projecting from the cylinder to the outside, a first partition member disposed in one end of the cylinder to define a third liquid chamber from the first liquid chamber and having two groups of ports each group of which has at least a port affording communication between the first and third liquid chambers, a valve body disposed so as to open and close the port of each group in the partition member, a second partition member disposed in the other end of the cylinder, from which the piston rod projects, to define a fourth liquid chamber from the second chamber and having two groups of ports each group of which has at least a port affording communication between the second and fourth liquid chambers, a valve body disposed so as to open and close the port of each group in the second partition member, a liquid path affording communication between the first and second liquid chambers without passing through the piston and regulating means provided in the piston rod and capable of blocking liquid flowing through the two groups of ports in the piston.

The third and fourth liquid chambers communicate to each other through the liquid path, a liquid path separately provided or respectively communicate to separate reservoir tanks.

The flow rate of liquid urged to flow through a damping force generating section other than the piston under the condition that liquid can flow through the port in the piston is substantially different from that under the condition that liquid is blocked from flowing through the port by the regulating means. As a result, a differential pressure generated across the damping force generating section other than the piston is increased. Accordingly, the damping force property greatly varies within the valve region.

Since it is possible to greatly vary the damping force property within the valve region, the damping force property when the piston speed is high can be adapted to the travelling condition of a vehicle, whereby the optimum ride comfort and controllability can be ensured.

BRIEF DESCRIPTION OF THE DRAWINGS

The foregoing and other objects and features of the invention will become apparent from the following description of a preferred embodiment of the invention with reference to the accompanying drawings, in which:

FIGS. 6 and 7 are graphic representations showing a characteristic of a damping force respectively, in which FIG. 6 is a graph according to the present invention and FIG. 7 is a graph according to a prior art.

DETAILED DESCRIPTION OF PREFERRED EMBODIMENT

Figure 1:
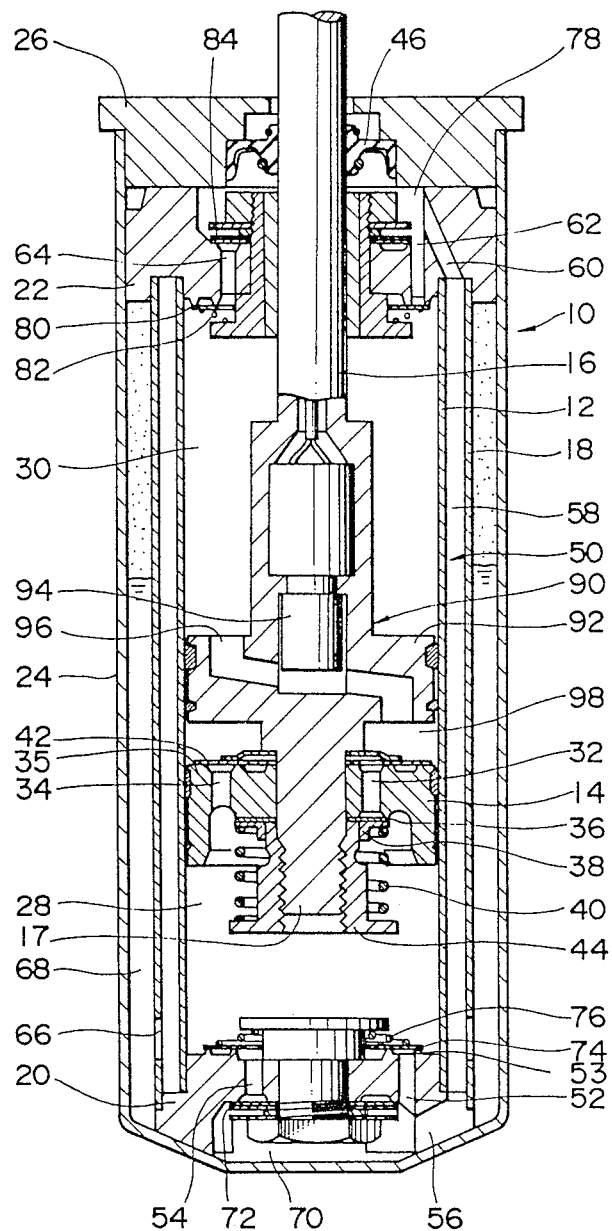
FIG. 1 is a sectional view showing a shock absorber.

As shown in FIG. 1, a shock absorber 10 comprises a cylinder 12, a piston 14 and a piston rod 16.

The shock absorber 10 in the embodiment shown is a so-called twin cylinder type shock absorber which has the cylinder 12 disposed in the inside and a cylinder 18 disposed in the outside and spaced from the cylinder 12 in the radial direction. Both ends of respective cylinders 12,18 are fitted in a valve case 20 and a guide 22. The cylinders 12,18 integral with the valve case 20 and guide 22 are inserted into a shell 24 and a cap 26 is screwed into an opening of the shell 24, whereby these components are held at a predetermined position in the shell 24.

The piston 14 is disposed movably in the cylinder 12 to partition the interior of the cylinder 12 into first and second liquid chambers 28,30 and has two groups of ports 32,34 affording communication between the first and second liquid chambers 28,30. Each group has at least a port. The port 32 permits liquid to flow therethrough when the piston rod 16, which will be later described, is extended while the port 34 permits liquid to flow therethrough when the piston rod is contracted. In the embodiment shown, a plurality of these ports are provided in the respective groups and disposed circumferentially at equal intervals.

A valve body 36 formed annularly of a leaf spring is disposed at the underside of the piston 14 so as to open and close the port 32. The valve body 36 receives a spring force of a coiled spring 40 through an axially movable spring carrier 38. Thus, the valve body 36 together with the port 32 constitutes a mechanism which generates the damping force within the valve region when the piston rod is extended. Further, an outside land surrounding an upper end of the port 34 is provided with at least an orifice 35 to generate the damping force within the orifice region when the piston rod is extended.

A valve body 42 annularly formed of a leaf spring is disposed on the upside of the piston 14 so as to open and close the port 34. The spring force of the valve body 42 is so small that the damping force is not generated substantially in the port 34. Namely, the valve body 42 functions as a check valve for blocking the liquid from flowing from the liquid chamber 30 through the port 34 to the liquid chamber 28.

Onto one end 17 of the piston rod 16 are inserted the valve body 42, piston 14 and valve body 36 in the order mentioned, and a nut 44 serving as a spring carrier is screwed onto the end 17. By so doing, the piston rod 16 together with the valve bodies 42,36 is connected with the piston 14. The other end of the piston rod projects from the cylinder 12 through the guide 22 and cap 26 to the outside. An oil seal 46 is attached between the cap 26 and the piston rod 16.

A liquid path 50 is provided for affording communication between the first and second liquid chambers 28,30 without passing through the piston 14. In the embodiment shown, the liquid path 50 is constituted from ports 52,54 formed in the valve case 20, a path 56 formed in the valve case 20, a space 58 between the inner and outer cylinders 12,18, a path 60 formed in the guide 22 and ports 62,64 formed in the guide 22. And, the space 58 between the inner and outer cylinders communicates to a space 68 between the cylinder 18 and the shell 24 through holes 66 bored in the outer cylinder 18. The space 68 serves as a reservoir tank.

First means and second means are provided for generating the damping force by liquid flowing through the liquid path 50. One of the first and second damping force generating means generates the damping force when the piston rod 16 is extended while the other means generates the damping force when the piston rod 16 is contracted. In the embodiment shown, one means for generating the damping force when the piston rod 16 is contracted is constituted in relation to the valve case 20 disposed on one end of the cylinder 12 and the other means for generating the damping force when the piston rod 16 is extended is constituted in relation to the guide 22 disposed on the other end of the cylinder 12.

The valve case 20 on the bottom of the cylinder 12 defines a third liquid chamber 70 from the first liquid chamber 28. Both liquid chambers 28,70 communicate to each other through two groups of ports 52,54. Each group has at least a port.

A valve body 72 annularly formed of a leaf spring is disposed on the underside of the valve case 20 so as to open and close the port 54. The valve body 72 together with the port 54 generates the damping force within the valve region when the piston rod is contracted. Further, an outside land surrounding the upper end of the port 52 is formed with at least an orifice 53 to generate the damping force within the orifice region when the piston rod is contracted.

An annularly formed valve body 74 is disposed on the upside of the valve case 20 so as to open and close the port 52 and biased toward the valve case 20 by a coiled spring 76. The spring force of the coiled spring 76 is so small that the damping force is not substantially generated in the port 52. That is, the valve body 74 functions as a check valve for blocking the liquid from flowing from the liquid chamber 28 through the port 52 to the liquid chamber 70.

The guide 22 on the upper end of the cylinder 12 defines a fourth liquid chamber 78 from the second liquid chamber 30. Both liquid chambers 30,78 communicate with each other through two groups of ports 62,64. Each group has at least a port.

An annularly formed valve body 80 is disposed on the underside of the guide 22 so as to open and close the port 62, and biased toward the guide 22 by a coiled spring 82. The spring force of the coiled spring 82 is so small that the damping force is not substantially generated in the port 62. That is, the valve body 80 functions as a check valve for blocking the liquid from flowing from the liquid chamber 30 through the port 62 to the liquid chamber 78.

A valve body 84 annularly formed of a leaf spring is disposed on the upside of the guide 22 so as to open and close the port 64. This valve body 84 together with the port 64 generates the damping force within the valve region when the piston rod is extended. Further, an outside land surrounding the lower end of the port 62 is formed with at least an orifice (not shown) to generate the damping force within the orifice region when the piston rod is extended.

The piston rod 16 is provided with regulating means 90 which can block the liquid from flowing through the two groups of ports 32,34 in the piston 14.

In the embodiment shown, the regulating means 90 has a second piston 92 provided on the piston rod 16 and disposed at an interval from the piston 14 as illustrated and a spool 94 rendering to be operative by a solenoid. The piston 92 is provided with a path 96 having a large bore. The path 96 communicates on one end to the liquid chamber 30 and on the other end to a liquid chamber 98 defined between the piston 14 and the piston 92. This path 96 is opened when the spool 94 is moved to the upper position shown while it is closed when the spool 94 is moved downward by energization of the solenoid. The bore of the path 96 is formed larger than the bores of all ports. It does not affect the damping force depending upon the resistance of liquid passing through this path 96.

The operation of the shock absorber will be now described with reference to FIGS. 2 to 5. Further, in FIGS. 2 and 3, since liquid does not flow through the ports 32,34 in the piston 14, the ports in the piston 14 and valve bodies are not shown.

The interior of the cylinder 12 and space 58 between the cylinders 12,18 are filled with oil. Oil is put in such a manner that oil partially occupies a lower portion of the reservoir tank 68, and compressed gas is enclosed in an upper portion of the reservoir tank 68.

In the case of generating high damping force:

The solenoid is operated from the outside to move the spool 94 of the regulating means 90 and then the path 96 is closed. By so doing, the oil is stopped from flowing through the ports 32,34 in the piston 14.

Figure 2:
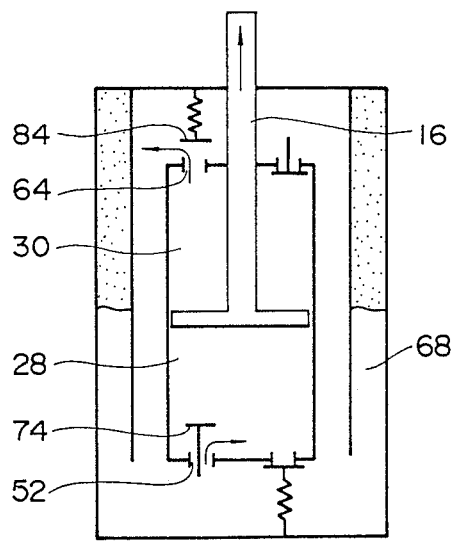
FIGS. 2 to 5 are schematic views respectively showing the operation of the shock absorber.

As shown in FIG. 2, when the piston rod 16 is extended, the oil in the liquid chamber 30 flows through the port 64 to push up the valve body 84, while a pressure in the liquid chamber 30 is increased since the flow rate of the oil urged to flow through the port 64 is large. On the other hand, the oil supplied from the reservoir tank 68 flows through the port 52 into the liquid chamber 28 after pushing up the valve body 74. Then, the damping force is not generated in the valve body 74, so that the pressure in the liquid chamber 28 becomes equal to that in the reservoir tank 68. Thus, a pressure corresponding to the differential pressure between both liquid chambers 30,28 acts on the port 64 and valve body 84 to generate the damping force.

Figure 3:
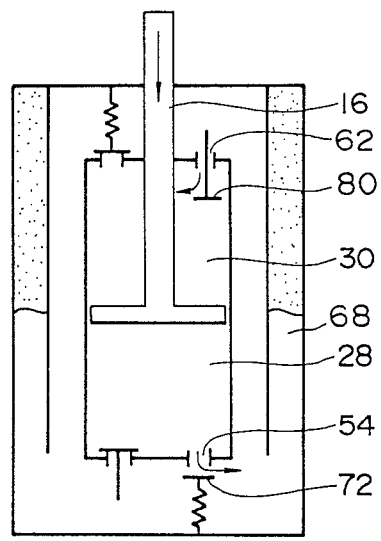

When the piston rod 16 is contracted, as shown in FIG. 3, the oil in the liquid chamber 28 flows through the port 54 after depressing the valve body 72, while the pressure in the liquid chamber 28 is increased since the flow rate of the oil urged to flow through the port 54 is large. On the other hand, the oil supplied from the reservoir tank 68 flows through the port 62 into the liquid chamber 30 after depressing the valve body 80. Then, since the damping force is not generated in the valve body 80, the pressure in the liquid chamber 30 becomes equal to that in the reservoir tank 68. Thus, a pressure corresponding to the differential pressure between both liquid chambers 28,30 acts on the port 62 and valve body 80 to generate the damping force.

Further, in either of the cases as noted above, oil flows through the orifice to generate the damping force within the orifice region in the early period of the movement of the piston rod.

In the case of generating low damping force:

The solenoid is operated from the outside to move the spool 94 of the regulating means 90 and then the path 96 is opened. By so doing, oil flows through the ports 32,34 in the piston 14.

Figure 4:
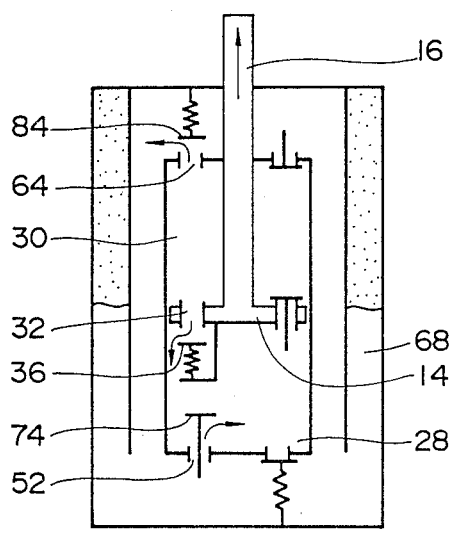

When the piston rod 16 is extended, as shown in FIG. 4, the oil in the liquid chamber 30 flows through the port 32 in the piston 14 after depressing the valve body 36, while it flows through the port 64 after pushing up the valve body 84, so that the pressure in the liquid chamber 30 is reduced. On the other hand, the oil supplied from the liquid chamber 30 flows into the liquid chamber 28, and the oil from the reservoir tank 68 flows through the port 52 after pushing up the valve body 74. In this case, the pressure in the liquid chamber 28 becomes equal to that in the reservoir tank 68 since the damping force is not generated in the valve body 74.

Figure 5:
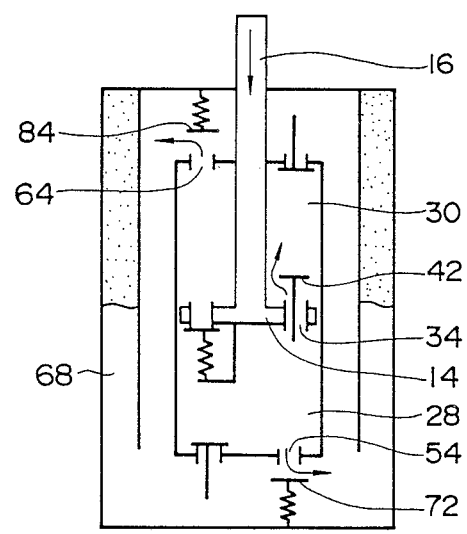

When the piston rod 16 is contracted, as shown in FIG. 5, the oil in the liquid chamber 28 flows through the port 34 in the piston 14 into the liquid chamber 30 after pushing up the valve body 42, so that the differential pressure acting on the upper and lower surfaces of piston 14 is lost. However, since the oil corresponding to the entered volume of the piston rod 16 flows from the liquid chambers 28,30 on one hand through the port 54 after depressing the valve body 72 and on the other hand through the port 64 after pushing up the valve body 84, the pressure in the liquid chambers 28,30 is increased. At this time, since pressure acts on a pressure receiving area corresponding to an effective area of the piston rod in the liquid chamber 28, the damping force is generated at the contraction side. This damping force is, however, small since the pressure receiving area is small.

Figure 6:
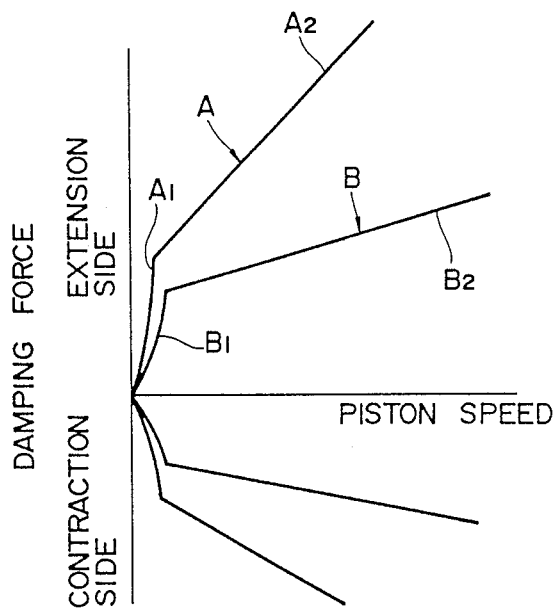

FIG. 6 shows qualitatively the above results.

In the high damping force condition A, the damping force property varies from the orifice region $A_1$ to the valve region $A_2$. On the contrary, the damping force property in the low damping force condition B varies from the orifice region $B_1$ to the valve region $B_2$.

Figure 7:
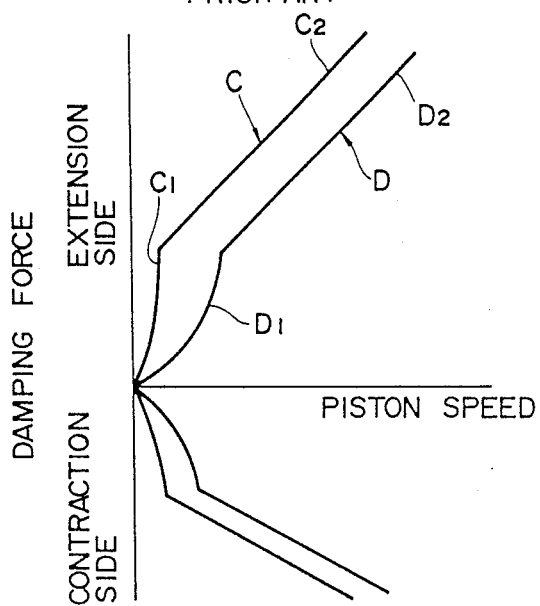

If the damping force property of the shock absorber according to the present invention is compared with that (shown in FIG. 7) of the prior art shock absorber disclosed in Japanese Utility Model Public Disclosure as noted above, in which the damping force property varies from the orifice region $C_1$ to the valve region $C_2$ in the high damping force condition C while it varies from the orifice region $D_1$ to the valve region $D_2$ in the low damping force condition D, a remarkable change in the damping force within the valve region is particularly found in the shock absorber of the present invention.

The shock absorber capable of changing over the damping force into a plurality of stages as described in the Japanese Utility Model Public Disclosure as noted above has been necessary to intensity the throttle action of the valve body provided on the piston in order to expand a range of variation in the damping force at the contraction side of the piston rod. Thus, when it is necessary to generate a large damping force, the pressure in the liquid chamber on the upside of the piston has been reduced, thereby resulting in generation of cavitations. Further, when the cavitations are generated, the generation of the damping force at the extension side has been delayed and abnormal sounds have been generated. However, in the embodiment of the shock absorber according to the present invention, there is no possibility that the pressure in the low pressure side becomes lower than that in the reservoir tank. Therefore, the generation of cavitations can be prevented.

Also, under the low damping force condition, the shock absorber described in the Public Disclosure as noted above has been extremely small in the damping force in the low piston speed region, whereas the shock absorber according to the present invention provides a sufficient damping force and a preferable property of the shock absorber for a suspension system.

What is claimed is:

1. A shock absorber comprising:
   a cylinder;
   a piston disposed movably in the cylinder to partition the interior of the cylinder into first and second liquid chambers and having two groups of ports each group of which has at least a port affording communication between said first and second liquid chambers;
   a valve body disposed so as to open and close the port of each group in the piston;
   a piston rod connected with said piston and projecting from said cylinder to the outside;
   a liquid path affording communication between said first and second liquid chambers without passing through said piston;
   first means and second means for generating damping force, each means having a valve body which opens and closes the liquid path and on which means for supplying spring force is worked, the damping force being generated when liquid flows through the liquid path with the valve body opened against said spring force; and
   regulating means provided in said piston rod for preventing completely liquid from flowing through said two groups of ports in said piston, so as to control a flow pattern of liquid through said valve bodies.

2. A shock absorber as claimed in claim 1, wherein said liquid path is communicated to a reservoir.

3. A shock absorber as claimed in claim 1, further comprising another cylinder disposed radially outwardly of said cylinder, wherein a first space is defined by two cylinders, the first space being a part of said liquid path.

4. A shock absorber as claimed in claim 3, further comprising a shell disposed radially outwardly of said another cylinder, wherein a second space is defined by said another cylinder and the shell, the second space being a reservoir.

5. A shock absorber comprising:
   a cylinder;
   a piston disposed movably in the cylinder to partition the interior of the cylinder into first and second liquid chambers and having two groups of ports each group of which has at least a port affording communicating between said first and second liquid chambers;
   a valve body disposed so as to open and close the port of each group in the piston;
   a piston rod connected with said piston and projecting from said cylinder to the outside;
   a first partition member disposed in one end of said cylinder to define a third liquid chamber from said first liquid chamber and having two groups of ports each of which has at least a port affording communication between said first and third liquid chambers;
   a valve body disposed so as to open and close the port of each group in the partition member;
   a second partition member disposed in the other end of said cylinder to define a fourth liquid chamber from said second liquid chamber and having two groups of ports each of which has at least a port affording communication between said second and fourth liquid chambers;
   a valve body disposed so as to open and close the port of each group in the second partition member;
   a liquid path affording communication between the first and second liquid chambers without passing through the piston, said liquid path being communicated to a reservoir through a communicating means; and
   regulating means provided in said piston rod for completely preventing liquid from flowing through said two groups of ports in said piston.

6. A shock absorber as claimed in claim 5, further comprising another cylinder disposed radially outwardly of said cylinder, wherein a first space is defined by two cylinders, the first space being a part of said liquid path.

7. A shock absorber as claimed in claim 7, further comprising a shell disposed radially outwardly of said another cylinder, wherein a second space is defined by said another cylinder and the shell, the second space being a reservoir.

8. A shock absorber as claimed in claim 5, wherein said third and fourth liquid chambers are communicated to the liquid path.

9. A shock absorber comprising:
   a cylinder;
   a piston disposed movably in the cylinder to partition the interior of the cylinder into first and second liquid chambers and having two groups of ports each group of which has at least a port affording communication between said first and second liquid chambers;
   a valve body disposed so as to open and close the port of each group in the piston;
   a piston rod connected with said piston and projecting from said cylinder to the outside;
   a liquid path affording communication between said first and second liquid chambers without passing through said piston;
   first means and second means for generating respectively damping force with liquid flowing through the liquid path; and
   regulating means provided in said piston rod for blocking liquid from flowing through said two groups of ports in said piston, said regulating means including another piston disposed at an interval from said piston and having a path communicating one of said first and second liquid chambers with the interval and a spool for opening and closing the path of said another piston.

10. A shock absorber as claimed in claim 9, wherein said spool is activated by a solenoid.

11. A shock absorber comprising:
a cylinder;
a piston disposed movably in the cylinder to partition the interior of the cylinder into first and second liquid chambers and having two groups of ports each group of which has at least a port affording communication between said first and second liquid chambers;
a valve body disposed so as to open and close the port of each group in the piston;
a piston rod connected with said piston and projecting from said cylinder to the outside;
a first partition member disposed in one end of said cylinder to define a third liquid chamber from said first liquid chamber and having two groups of ports each of which has at least a port affording communication between said first and third liquid chambers;
a valve body disposed so as to open and close the port of each group in the partition member;
a second partition member disposed in the other end of said cylinder to define a fourth liquid chamber from said second liquid chamber and having two groups of ports each of which has at least a port affording communication between said second and fourth liquid chambers;
a valve body disposed so as to open and close the port of each group in the second partition member;
a liquid path affording communication between the first and second liquid chambers without passing through the piston; and
regulating means provided in said piston rod for blocking liquid from flowing through said two groups of ports in said piston, said regulating means including another piston disposed at an interval from said piston and having a path communicating one of said first and second liquid chambers with the interval and a spool for opening and closing the path of said another piston.

12. A shock absorber as claimed in claim 11, wherein said spool is activated by a solenoid.

13. A shock absorber comprising:
a cylinder;
a piston disposed movably in the cylinder to partition the interior of the cylinder into first and second liquid chambers and having two groups of ports each group of which has at least a port affording communication between said first and second liquid chambers;
a valve body disposed so as to open and close the port of each group in the piston;
a piston rod connected with said piston and projecting from said cylinder to the outside;
a liquid path affording communication between said first and second liquid chambers without passing through said piston;
first means and second means for generating damping force disposed respectively at both ends of said cylinder, each means having a valve body which opens and closes the liquid path and on which means for supplying spring force is worked, the damping force being generated when liquid flows through the liquid path with the valve body opened against said spring force; and
regulating means provided in said piston rod for blocking liquid from flowing through said two groups of ports in said piston.

14. A shock absorber comprising:
a cylinder;
a piston disposed movably in the cylinder to partition the interior of the cylinder into first and second liquid chambers and having two groups of ports each group of which has at least a port affording communication between said first and second liquid chambers;
a valve body disposed so as to open and close the port of each group in the piston;
a piston rod connected with said piston and projecting from said cylinder to the outside;
a liquid path affording communication between said first and second liquid chambers without passing through said piston;
first means and second means for generating damping force, each means having a valve body which opens and closes the liquid path and on which means for supplying spring force is worked, the damping force being generated when liquid flows through the liquid path with the valve body opened against said spring force; and
regulating means provided in said piston rod for blocking liquid from flowing through said two groups of ports in said piston, said regulating means including another piston disposed at an interval from said piston and having a path communicating one of said first and second liquid chambers with the interval and a spool capable of opening and closing the path of said another piston.

15. A shock absorber as claimed in claim 14, wherein said spool is actuated by a solenoid.

* * * * *